United States Patent Office 3,062,714
Patented Nov. 6, 1962

3,062,714
ANTACID COMPOSITION
Courtney G. Pitkin, University City, and Arun K. Mitra, St. Louis, Mo., assignors to Lewis-Howe Company, St. Louis, Mo., a corporation of Delaware
No Drawing. Filed Mar. 11, 1960, Ser. No. 14,209
11 Claims. (Cl. 167—55)

The present invention relates generally to an improved antacid composition.

Antacid compositions for relieving hyperacidity caused by excess acid in the stomach are well known in the art, but calcium and magnesium salts or combinations thereof, which are most frequently used as the active acid neutralizing constituents in antacid compositions, have not been entirely satisfactory heretofore. An objection to known antacid compositions is that the pH of the stomach is generally raised to an undesirably high level, frequently to an alkaline condition, and the antacid over-neutralizes gastric fluids secreted by the stomach for undesirable periods of time. Antacids containing calcium and magnesium salts have also been objectionable heretofore by reason of a so-called "metallic" taste generally attributed to the presence of free calcium and magnesium ions.

The principal object of the present invention is to provide an antacid composition for neutralizing gastric fluids within controlled pH ranges for prolonged periods of time in order to permit digestion to take place and to prevent hyperacidity. Another object is to provide an antacid composition which will not over-neutralize gastric fluids. Another object is to provide an antacid composition formulated with calcium and magnesium compounds, but not having the characteristic high alkalinity or extreme maximum neutralizing effect normally resulting from such compounds. Still another object is to provide an antacid having means for effectively controlling the pH of the stomach, and which is readily available and is simply and economically compounded with the active antacid ingredients. A further object is to provide a novel antacid composition containing a calcium antacid and a phosphate for controlling ionization thereof to prevent a metallic after-taste and improve the taste characteristics thereof. These and other objects and advantages will become apparent hereafter.

Briefly, the present invention comprises an antacid composition including as the principal active antacid ingredient a calcium or magnesium compound or combination thereof, and a small amount of a sodium, potassium or ammonium phosphate or combination thereof.

Most antacid compositions which are well known and widely used are formulated with the salts of metals, such as calcium carbonate, magnesium carbonate, magnesium hydroxide and magnesium oxide all of which are officially and currently recognized in the United States Pharmacopoeia as antacids. In addition, other pharmaceutical preparations utilizing these and other acid neutralizing chemicals, either singly or in combination, may produce antacid and antiulcerative effects.

Most of the antacid compositions presently available may be defined as being "strong" antacids in that they raise the pH of the gastric fluid to an undesirably high level above pH 6.0, which is almost neutral, and many antacids produce a basic gastric fluid condition. Although a relatively large amount of excess acid or gastric fluid having a pH of about 1.2 to 2.0 is generally present and desirable at the time of ingestion of large quantities of food because rapid digestion is facilitated, the continued presence of excess or free acid maintaining the stomach pH below about 3.0 is believed to be undesirable and the cause of what is commonly known as stomach distress, upset, gas or sour stomach. This condition may also be referred to as hyperacidity to denote the presence in the stomach of excess acid. There is some divergence of opinion regarding the optimum pH range in which antacids can work without adversely affecting the digestive processes, but it is generally accepted that the gastric fluids should not be neutralized above about pH 6.0 and preferably should have a pH of about 5.0 or lower for effective digestion to continue. If the pH of the stomach is raised to a neutral or basic level above about pH 6.0, the stomach enzyme, pepsin, which is necessary for digestion, will be ineffective and digestion of food will not take place during the time period the stomach pH remains over 6.0. Furthermore, introduction of a strong antacid into the stomach tends to over-neutralize the acid in the stomach and this condition is ordinarily followed by a sharp acid rebound in which acid in larger quantities or at more rapid rates is secreted to compensate for the alkaline condition and frequently the acid reaction or rebound exceeds the normal acid concentration in the stomach before the antacid was taken and produces hyperacidity. It is also possible for long continued use of antacids to result in hyperacidity of the stomach.

Although the normal working pH of the gastric fluid during digestion is about pH 1.5 to 3.0 even though digestion will continue to take place at slower rates for less acidic levels up to about pH 6.0, in cases of hyperacidity or peptic ulcer it is desirable that an antacid neutralize gastric fluids to a maximum pH generally above pH 3.0 and not appreciably above 5.0 in order that digestion can continue. After initial neutralization, any excess antacid present in the stomach will neutralize an additional amount of acid gastric fluid secreted to tend to maintain a constant gastric fluid pH.

The effectiveness and working characteristics of antacids in the human stomach have been given careful study and, although many techniques or methods have been suggested for evaluating such antacids, none of them has been universally accepted. The present invention has been analyzed according to a technique of Robert H. Schleif for antacid evaluation using in vitro studies to simulate in vivo conditions. This technique is reported in the Journal of the American Pharmaceutical Association, Scientific Edition, vol. XLVI, No. 3, March 1957.

Briefly, according to the Schleif technique 50 ml. of simulated gastric fluid (U.S.P. XV) and 50 ml. of distilled water are mixed and a specified amount of an antacid is then added. Additional simulated gastric fluid is added at a predetermined rate and the pH of the solution in the beaker is recorded automatically on a graph showing pH and time coordinates during the entire test period so that the maximum pH reached and the speed and duration of the action are determined. The action of an antacid is considered ended when the pH falls below 3.0.

The present invention is embodied in a composition having as its active ingredients a predetermined proportion of (1) an active antacid compound and (2) a phosphate selected from a group consisting of sodium, potassium and ammonium. The composition is stable and simply compounded, and the maximum pH value and duration of time of high pH value of the present composition at work is less than the maximum pH and duration of time of high pH of the active antacid compound alone. However, the total acid neutralizing capacity of the present antacid composition is not appreciably different from that of the antacid alone.

The sodium, potassium and ammonium phosphates which may be utilized in the invention are non-toxic, at least when administered in small amounts into the human system, and do not upset any of the natural body functions or balances. Examples of phosphates that can be used singly or in combination in the present antacid compositions include sodium phosphate, sodium metaphosphate, sodium hexametaphosphate, sodium tripolyphosphate, sodium acid pyrophosphate, trisodium phosphate, potassium metaphosphate, monopotassium phosphate, tripotassium phosphate, tetrapotassium pyrophosphate, diammonium phosphate and sodium ammonium phosphate. This list of phosphates is not intended to be exhaustive and is only illustrative of those that may be used in practicing this invention as are the phosphates set out in the tables and examples, and all sodium, potassium and ammonium phosphates are intended to be covered.

Typical antacid compounds which may be used to form antacid compositions according to this invention include calcium carbonate, magnesium oxide, magnesium hydroxide, and magnesium carbonate. It is to be understood that these and other calcium and magnesium antacid compounds in major portions as the essential active antacid ingredient may be combined with still other antacids, such as aluminum hydroxide to form the acid neutralizing portion of an antacid composition, and which when compounded with small portions of sodium, potassium or ammonium phosphates will produce controlled stomach acidity or pH values.

In Table I, the antacid activity of different amounts of calcium carbonate ($CaCO_3$) has been shown according to the Schleif method set as a basis for comparison with antacid compositions set out in Table II, which include calcium carbonate as the principal active ingredient and various phosphate additives.

TABLE I

| No. | Active Antacid | Maximum pH | Minutes over pH | | | |
|---|---|---|---|---|---|---|
| | | | 6.0 | 5.5 | 5.0 | 3.0 |
| 1 | $CaCO_3$ (1.0 gm.) | 6.50 | 34 | 44 | 46 | 50 |
| 2 | $CaCO_3$ (0.9 gm.) | 6.19 | 22 | 36 | 38 | 42 |
| 3 | $CaCO_3$ (0.8 gm.) | 6.02 | 13 | 30 | 32 | 36 |
| 4 | $CaCO_3$ (0.5 gm.) | 5.86 | 0 | 14 | 17 | 18 |

It is believed that when an antacid compound is taken the maximum pH of gastric fluid may be kept at lower values by reducing the quantity of the antacid, and that the antacid activity of lesser amounts falls off at an accelerated rate with respect to the conditions under which an antacid is taken so that the duration of activity is not proportional with the amount of antacid taken. For purposes of illustration it is understood that the antacid dosage will be about one gram of the composition and that a maximum duration of antiacid activity is desirable.

Referring to Table II it will be seen that antacid compositions according to the invention provide a maximum pH of gastric fluid which is significantly lower than that of the calcium carbonate along, but that the duration of antacid activity of the present antacid is not materially shortened. The Table II examples are based on one gram samples including the specified percentage of phosphate.

TABLE II

| No. | Composition | Maximum pH | Minutes over pH | | | |
|---|---|---|---|---|---|---|
| | | | 6.0 | 5.5 | 5.0 | 3.0 |
| 1 | $CaCO_3$ and Sodium hexametaphosphate (10%) | 4.92 | 0 | 0 | 0 | 40 |
| 2 | $CaCO_3$ and Sodium dihydrogen phosphate (10%) | 5.71 | 0 | 30 | 37 | 42 |
| 3 | $CaCO_3$ and Sodium hexametaphosphate (20%) | 4.82 | 0 | 0 | 0 | 35 |
| 4 | $CaCO_3$ and Sodium hexametaphosphate (0.1%) | 6.09 | 16 | 34 | 40 | 48 |
| 5 | $CaCO_3$ and Sodium hexametaphosphate (0.25%) | 5.94 | 0 | 31 | 37 | 48 |
| 6 | $CaCO_3$ and Sodium hexametaphosphate (0.5%) | 5.65 | 0 | 17 | 33 | 47 |
| 7 | $CaCO_3$ and Sodium hexametaphosphate (0.75%) | 5.63 | 0 | 10 | 32 | 47 |
| 8 | $CaCO_3$ and Sodium hexametaphosphate (1.0%) | 5.6 | 0 | 2 | 26 | 47 |
| 9 | $CaCO_3$ and Sodium hexametaphosphate (2.0%) | 5.35 | 0 | 0 | 3 | 47 |
| 10 | $CaCO_3$ and Sodium hexametaphosphate (5.0%) | 5.22 | 0 | 0 | 2 | 43 |
| 11 | $CaCO_3$ and Sodium metaphosphate (1.0%) | 5.53 | 0 | 1 | 25 | 47 |
| 12 | $CaCO_3$ and Amorphous glass of composition equivalent to $Na_5P_6O_{10}$ (1.0%) | 5.35 | 0 | 0 | 25 | 46 |
| 13 | $CaCO_3$ and Sodium tripolyphosphate (1.0%) | 5.55 | 0 | 1 | 40 | 48 |
| 14 | $CaCO_3$ and Sodium tripolyphosphate (2.0%) | 5.35 | 0 | 0 | 15 | 46 |
| 15 | $CaCO_3$ and Tetrasodium pyrophosphate (1.0%) | 5.32 | 0 | 0 | 20 | 47 |
| 16 | $CaCO_3$ and Sodium acid pyrophosphate (1.0%) | 5.25 | 0 | 0 | 20 | 47 |
| 17 | $CaCO_3$ and Sodium diammonium phosphate (5.0%) | 5.87 | 0 | 30 | 37 | 42 |
| 18 | $CaCO_3$ and Sodium dihydrogen phosphate (5.0%) | 5.8 | 0 | 32 | 42 | 45 |
| 19 | $CaCO_3$ and Disodium phosphate-anhydrous (5.0%) | 5.94 | 0 | 37 | 39 | 45 |
| 20 | $CaCO_3$ and Trisodium phosphate (5.0%) | 5.63 | 0 | 29 | 42 | 45 |
| 21 | $CaCO_3$ and Monopotassium phosphate (5.0%) | 5.80 | 0 | 35 | 41 | 44 |
| 22 | $CaCO_3$ and Tripotassium phosphate (5.0%) | 5.85 | 0 | 36 | 42 | 45 |
| 23 | $CaCO_3$ and Tetrapotassium pyrophosphate (1.0%) | 5.15 | 0 | 0 | 3 | 49 |
| 24 | $CaCO_3$ and Tetrapotassium pyrophosphate (5.0%) | 4.80 | 0 | 0 | 0 | 45 |
| 25 | $CaCO_3$ and Potassium metaphosphate (1.0%) | 6.05 | 20 | 43 | 44 | 48 |
| 26 | $CaCO_3$ and Potassium metaphosphate (2.0%) | 6.03 | 15 | 42 | 45 | 49 |
| 27 | $CaCO_3$ and Diammonium phosphate (1.0%) | 6.07 | 18 | 42 | 44 | 47 |
| 28 | $CaCO_3$ and Diammonium phosphate (5.0%) | 5.68 | 0 | 30 | 35 | 50 |

According to the present invention, an active antacid compound and an ammonium, sodium or potassium phosphate are combined in a predetermined proportion comprising a major portion of the former and a minor portion of the latter. In this proportion, the antacid compound preferably constitutes between about 80% and 99.75% of the antacid composition and the phosphate additive varies between about 20% and 0.25%, by weight, of the antacid composition. The antacid constituents comprise the essential active ingredients in a predetermined proportion with the phosphate additives and it is apparent that suitable excipients may be added to the present composition for preparing the antacid composition in dry form, such as tablet, capsule, or powder, and for adding flavor and the like thereto.

The present composition should include a small portion of a suitable phosphate in an amount greater than about 0.1% and preferably from about 0.5% to 10%, by weight, of the active antacid. The presently preferred phosphate is sodium hexametaphosphate and the preferred proportion of this phosphate is 1.0%, by weight, or 1 part to 99 parts in a composition consisting essentially of the sodium hexametaphophsphate and an active calcium and/or magnesium antacid. A comparison of Tables I and II will show that the gastric fluid remains near or below pH 6.0 when an antacid composition consisting essentially of calcium carbonate and a predetermined portion of a sodium, potassium or ammonium phosphate is taken, and that the addition of even as small a portion as 0.1% sodium hexametaphosphate produces a significant drop in the maximum pH relative to the pH produced by calcium carbonate alone. However, the effective duration of antacid activity above pH 3.0 is not materially shortened.

In using some phosphates, it may be necessary to increase the portion thereof to some extent in order to maintain the gastric fluid pH below 6.0 as is apparent from Table II.

Table III, which follows, shows the antacid activity of magnesium carbonate ($MgCO_3$) alone and in combination with calcium carbonate and also sets out representative antacid compositions having these active antacid compounds and condensed phosphate salts.

TABLE III

| No. | Antacid | Maximum pH | Minutes over pH | | | |
|---|---|---|---|---|---|---|
| | | | 6.0 | 5.5 | 5.0 | 3.0 |
| 1 | $MgCO_3$ (1 gm.) | 7.73 | 46 | 50 | 52 | 53 |
| 2 | $MgCO_3$ and Sodium hexametaphosphate (1.0%) | 7.0 | 38 | 45 | 47 | 52 |
| 3 | $MgCO_3$ and Sodium hexametaphosphate (5.0%) | 6.26 | 21 | 38 | 45 | 52 |
| 4 | $MgCO_3$ and Tetrapotassium pyrophosphate (5.0%) | 6.55 | 40 | 46 | 48 | 53 |
| 5 | $MgCO_3$ (0.5 gm.) and $CaCO_3$ (0.5 gm.) | 7.12 | 29 | 43 | 47 | 50 |
| 6 | $MgCO_3$ and $CaCO_3$ (equal amounts) and Sodium hexametaphosphate (1.0%) | 6.42 | 20 | 31 | 38 | 50 |
| 7 | $MgCO_3$ and $CaCO_3$ (equal amounts) and Sodium hexametaphosphate (5.0%) | 5.55 | 0 | 1 | 25 | 48 |
| 8 | $MgCO_3$ and $CaCO_3$ (equal amounts) and Sodium tripolyphosphate (0.5%) | 6.74 | 28 | 37 | 46 | 52 |
| 9 | $MgCO_3$ and $CaCO_3$ (equal amounts) and Sodium tripolyphosphate (5.0%) | 5.93 | 0 | 17 | 42 | 50 |

It is apparent from Table III that a magnesium antacid compound, such as magnesium carbonate alone or in combination with calcium carbonate, may be formed into a novel antacid composition by the addition of sodium, potassium or ammonium phosphates. The magnesium antacid compounds are somewhat stronger than the calcium antacids, but maximum pH values can be substantially reduced to a pH near 6 by the addition of phosphates in a proportion of about 95 parts active antacid to about 5 parts phosphate. It is important to note that significant drops in pH occur when as little as 1.0% phosphate is added. The significance of lowering the pH of magnesium antacids is further emphasized in the follow Table IV showing antacid activity of magnesium oxide —MgO— and magnesium hydroxide —$Mg(OH)_2$— both alone and in combination with calcium carbonate.

TABLE IV

| No. | Antacid | Maximum pH | Minutes over pH | | | |
|---|---|---|---|---|---|---|
| | | | 6.0 | 5.5 | 5.0 | 3.0 |
| 1 | MgO (0.5 gm.) | about 10.5 | 50 | 52 | 53 | 59 |
| 2 | MgO (0.5 gm.) and Sodium hexametaphosphate (1.0%) | 9.5 | 47 | 48 | 49 | 58 |
| 3 | MgO (0.5 gm.) and $CaCO_3$ (0.5 gm.) | 9.4 | 73 | 82 | 85 | 92 |
| 4 | MgO and $CaCO_3$ (equal amounts) and Sodium hexametaphosphate (1.0%) | 8.7 | 69 | 73 | 80 | 92 |
| 5 | $Mg(OH)_2$ (1 gm.) | 9.4 | 66 | 68 | 73 | 88 |
| 6 | $Mg(OH)_2$ (1 gm.) and Sodium hexametaphosphate (1.0%) | 8.9 | 57 | 62 | 68 | 88 |
| 7 | $Mg(OH)_2$ (0.5 gm.) and $CaCO_3$ (0.5 gm.) | 8.7 | 46 | 55 | 58 | 72 |
| 8 | $Mg(OH)_2$ and $CaCO_3$ (equal amounts) Sodium hexametaphosphate (1.0%) | 7.3 | 33 | 43 | 52 | 71 |

Table IV shows that highly alkaline antacids raise the gastric fluid pH to an undesirable level in the range of pH 8.0 to pH 10.5, and it is indicated that such antacid compounds should not be used alone because of the adverse effect produced by such extreme over-neutralization. However, addition of even small amounts of phosphates lower the maximum pH and substantially reduce the duration of time that the gastric fluid remains over pH 6.0, and the use of small portions of strongly alkaline antacids with a major portion of other calcium or magnesium salts to form the active antacid constituent in an antacid composition having a predetermined minor portion of an ammonium, sodium or potassium phosphate will produce an acceptable product according to the present invention.

The following examples further illustrate the present invention:

*Example 1*

99 parts of calcium carbonate are thoroughly mixed with 1 part of sodium hexametaphosphate in an aqueous medium to form an antacid composition, which will produce a controlled maximum gastric fluid pH under 6.0 and have an antacid activity of about 45 to 50 minutes according to the Schleif method.

*Example 2*

399 parts of calcium carbonate are mixed with 1 part of sodium hexametaphosphate to form a novel antacid composition.

*Example 3*

80 parts of calcium carbonate are combined with 20 parts of sodium hexametaphosphate to form an antacid composition.

*Example 4*

98 parts of calcium carbonate and 2 parts of sodium phosphate are combined to form an antacid composition.

*Example 5*

98 parts of calcium carbonate and 2 parts of sodium metaphosphate are combined to form an antacid composition.

*Example 6*

98 parts of calcium carbonate and 2 parts of sodium acid pyrophosphate are combined to form an antacid composition.

*Example 7*

98 parts of calcium carbonate and 2 parts of trisodium phosphate are combined to form an antacid composition.

*Example 8*

98 parts of calcium carbonate and 2 parts of sodium tripolyphosphate are combined to form an antacid composition.

*Example 9*

98 parts of calcium carbonate and 2 parts of tetrasodium pyrophosphate are combined to form an antacid composition.

*Example 10*

90 parts of calcium carbonate and 10 parts of sodium ammonium phosphate are combined to form an antacid composition.

*Example 11*

90 parts of calcium carbonate and 10 parts of monosodium phosphate are combined to form an antacid composition.

*Example 12*

199 parts of calcium carbonate and 1 part of tetrapotassium pyrophosphate are combined to form an antacid composition.

*Example 13*

95 parts of calcium carbonate and 5 parts of potassium metaphosphate are combined to form an antacid composition.

*Example 14*

90 parts of magnesium carbonate and 10 parts of sodium hexametaphosphate are combined to form an antacid composition.

*Example 15*

100 parts of magnesium carbonate and 5 parts of sodium acid pyrophosphate are combined to form an antacid composition.

*Example 16*

100 parts of magnesium carbonate and 5 parts of tetrasodium pyrophosphate are combined to form an antacid composition.

*Example 17*

100 parts of magnesium carbonate and 5 parts of tetrapotassium pyrophosphate are combined to form an antacid composition.

*Example 18*

45 parts of calcium carbonate and 45 parts of magnesium carbonate are mixed with 10 parts of sodium hexametaphosphate to form an antacid composition.

*Example 19*

45 parts of calcium carbonate and 45 parts of magnesium carbonate are mixed with 5 parts of tetrasodium pyrophosphate to form an antacid composition.

*Example 20*

75 parts of calcium carbonate and 20 parts of magnesium carbonate are mixed with 5 parts of sodium ammonium phosphate to form an antacid composition.

*Example 21*

75 parts of calcium carbonate and 20 parts of magnesium carbonate are mixed with 2 parts of sodium acid pyrophosphate to form an antacid composition.

*Example 22*

90 parts of calcium carbonate and 10 parts of magnesium carbonate are mixed with 5 parts of trisodium phosphate to form an antacid composition.

*Example 23*

75 parts of calcium carbonate and 25 parts of magnesium carbonate are mixed with 3 parts of tetrapotassium pyrophosphate to form an antacid composition.

*Example 24*

90 parts of calcium carbonate and 5 parts of magnesium oxide are mixed with 5 parts of sodium hexametaphosphate to form an antacid composition.

*Example 25*

90 parts of calcium carbonate and 3 parts of magnesium oxide are mixed with 7 parts of disodium phosphate to form an antacid composition.

*Example 26*

95 parts of calcium carbonate and 3 parts of magnesium oxide are mixed with 5 parts of sodium tripolyphosphate to form an antacid composition.

*Example 27*

95 parts of calcium carbonate and 3 parts of magnesium oxide are mixed with 3 parts of tetrapotassium pyrophosphate to form an antacid composition.

*Example 28*

95 parts of calcium carbonate and 5 parts of magnesium oxide are mixed with 10 parts of sodium ammonium phosphate to form an antacid composition.

*Example 29*

90 parts of calcium carbonate and 5 parts of magnesium hydroxide are mixed with 5 parts of tetrasodium pyrophosphate to form an antacid composition.

*Example 30*

90 parts of calcium carbonate and 5 parts of magnesium hydroxide are mixed with 5 parts of sodium acid pyrophosphate to form an antacid composition.

*Example 31*

95 parts of calcium carbonate and 3 parts of magnesium hydroxide are mixed with 5 parts of tetrapotassium pyrophosphate to form an antacid composition.

*Example 32*

95 parts of calcium carbonate and 3 parts of magnesium hydroxide are mixed with 7 parts of diammonium phosphate to form an antacid composition.

*Example 33*

97 parts calcium carbonate are mixed with 1 part of potassium metaphosphate and 2 parts of tetrapotassium pyrophosphate to form a novel antacid.

*Example 34*

94 parts calcium carbonate are mixed with 1 part of diammonium phosphate and 5 parts of sodium ammonium phosphate to form a novel antacid.

*Example 35*

98 parts calcium carbonate are mixed with 2 parts of anhydrous disodium phosphate and 3 parts of tetrasodium pyrophosphate to form a novel antacid.

*Example 36*

90 parts magnesium carbonate are mixed with 2 parts of sodium hexametaphosphate and 5 parts of sodium acid pyrophosphate to form a novel antacid.

*Example 37*

90 parts magnesium carbonate are mixed with 2 parts of potassium metaphosphate and 8 parts of tetrapotassium pyrophosphate to form a novel antacid.

*Example 38*

320 parts calcium carbonate are mixed with 40 parts of sodium hexametaphosphate and 40 parts of sodium ammonium phosphate to form a novel antacid.

*Example 39*

200 parts of precipitated calcium carbonate, 70 parts of magnesium carbonate, 60 parts of magnesium trisilicate and 70 parts of sodium hexametaphosphate are thoroughly mixed to form a novel antacid composition having a combination of calcium and magnesium salts and a single sodium phosphate.

*Example 40*

200 parts of calcium carbonate, 60 parts of magnesium carbonate, 60 parts of aluminum hydroxide and 50 parts of sodium hexametaphosphate are thoroughly mixed to form a new, more palatable antacid composition.

*Example 41*

200 parts of calcium carbonate, 60 parts of magnesium carbonate and 20 parts of magnesium hydroxide are combined with 50 parts of tetrapotassium pyrophosphate to form a new antacid preparation.

From the tables and examples given herein for purposes of illustration it will be apparent that the present antacid composition has an essential active antacid compound of calcium or magnesium, either alone or combined with or without other antacid compounds such as aluminum hydroxide, and a small portion of a phosphate from the group including sodium, potassium and ammonium. The method of controlling gastric pH by the use of phosphates and antacids is not known heretofore. The maximum pH which the gastric fluid reaches using the phosphate control is not the same for all antacids and the phosphate additives do not bring the maximum pH below 6.0 for every antacid, as shown by the results of the Schleif tests. However, all phosphates lower the maximum pH in the gastric fluid for all calcium and magnesium antacid compounds. The larger amounts of phosphates cause a lower maximum gastric fluid pH, but also lower the total acid consuming power of the antacid composition to some extent because the acid consuming calcium or magnesium salt is replaced by the phosphate. It has been found that a very effective antacid composition includes about 1% phosphate and about 99% calcium or magnesium compound, particularly when sodium hexametaphosphate and calcium carbonate are combined in the antacid. However, the percentage of the different phosphates can be varied between about 0.25% to about 20% and still form an effective antacid. It is to be understood that different amounts of the same phosphate or the same amounts of different phosphates will give different pH control during initial neutralization or buffering action of the antacids, and therefore the optimum level of the phosphate or combination of phosphates employed will depend upon the amount and nature of the antacid or the combination of antacids used.

It has also been discovered that the addition of a predetermined amount of a phosphate salt as disclosed herein also improves the taste characteristics of an antacid composition compounded with flavoring constituents. The taste is enhanced to an extent permitting a smaller amount of flavoring material to be added without any loss in the intensity or degree of flavor and generally with an increase thereof.

What we claim is:

1. An antacid composition having calcium carbonate as its principal active antacid ingredient, and about 0.25% to 5.0%, by weight of the principal active antacid ingredient, of sodium hexametaphosphate.

2. An antacid composition having calcium carbonate as its principal active ingredient, and about 0.5% to 10.0%, by weight of the principal active ingredient of a phosphate salt selected from the class consisting of sodium, potassium and ammonium and combinations thereof.

3. An antacid composition having as its principal active antacid ingredient an antacid selected from the class consisting essentially of calcium carbonate, magnesium carbonate, magnesium hydroxide and magnesium oxide and combinations thereof; and a portion of about 0.25% to 20.0%, by weight of the principal active antacid ingredient, of a phosphate salt selected from the class consisting of sodium, potassium and ammonium and combinations thereof.

4. The antacid composition according to claim 3 in which the phosphate salt is sodium hexametaphosphate.

5. The antacid composition according to claim 3 in which the phosphate salt is sodium metaphosphate.

6. The antacid composition according to claim 3 in which the phosphate salt is potassium metaphosphate.

7. The antacid composition according to claim 3 in which the phosphate salt is sodium tripolyphosphate.

8. The antacid composition according to claim 3 in which the phosphate salt is tetrasodium pyrophosphate.

9. The antacid composition according to claim 3 in which the phosphate salt is tetrapotassium pyrophosphate.

10. The antacid composition according to claim 3 in which the phosphate salt is sodium acid pyrophosphate.

11. The antacid composition according to claim 3 wherein the phosphate salt is capable, as determined by the Schleif method, of controlling the neutralization of simulated gastric fluid to a maximum pH lower than the maximum pH to which the principal active antacid ingredient per se would normally raise the simulated gastric fluid pH, and without substantially reducing the total acid consuming capacity of the principal active antacid ingredient.

References Cited in the file of this patent

UNITED STATES PATENTS 2,774,710     Thompson et al. _____ Dec. 18, 1956

OTHER REFERENCES

Remington's Practice of Pharmacy, pages 464, 499, 523, Mack Publishing Co., 1956.

Dale et al.: J. Am. Pharm. Assoc., vol. 44:3, pages 170–177.

Gore et al.: J. Pharm. and Pharmacol., vol. 5:10, pages 686–691.

Brindle et al.: J. Pharm. and Pharmacol., vol. 5:10 pages 692–707.